United States Patent [19]

Jaeger et al.

[11] 4,129,433

[45] Dec. 12, 1978

[54] FABRICATION OF AN OPTICAL FIBER WAVEGUIDE WITH PERIODIC VARIATIONS IN DIAMETER

[75] Inventors: Raymond E. Jaeger, Basking Ridge; Herman M. Presby, Highland Park, both of N.J.

[73] Assignee: Bell Telephone Laboratories, Incorporated, Murray Hill, N.J.

[21] Appl. No.: 895,816

[22] Filed: Apr. 12, 1978

Related U.S. Application Data

[63] Continuation of Ser. No. 732,344, Oct. 14, 1976, abandoned.

[51] Int. Cl.² ............................................. C03B 37/00
[52] U.S. Cl. ............................................. 65/2; 65/12; 65/13; 65/DIG. 7
[58] Field of Search .................... 65/3 A, 4 B, 2, 4 R, 65/13, DIG. 7, 12; 427/163

[56] References Cited

U.S. PATENT DOCUMENTS

| 3,666,348 | 5/1972 | Marcatili | 65/3 A X |
|---|---|---|---|
| 3,865,564 | 2/1975 | Jaeger | 65/2 |
| 3,912,478 | 10/1975 | Presby | 65/2 |
| 3,981,705 | 9/1976 | Jaeger et al. | 65/2 |
| 4,022,602 | 5/1977 | Pavlopoulos | 65/2 |

*Primary Examiner*—Robert L. Lindsay, Jr.
*Attorney, Agent, or Firm*—Peter V. D. Wilde

[57] ABSTRACT

An optical fiber is drawn from an appropriate preform using a laser whose output power is varied periodically at a rate greater than ten times a second. A fiber drawn in this manner has periodic variations in diameter which enhance the mode conversion properties of the fiber and thereby reduce the pulse dispersion of a signal transmitted through the waveguide.

7 Claims, 2 Drawing Figures

FABRICATION OF AN OPTICAL FIBER WAVEGUIDE WITH PERIODIC VARIATIONS IN DIAMETER

This application is a continuation of application Ser. No. 732,344, filed Oct. 14, 1976 now abandoned.

BACKGROUND OF THE INVENTION

1. Field of the Invention

This invention involves the fabrication of optical fiber waveguides.

2. Description of the Prior Art

Two basic properties are of primary interest in the design of optical fiber waveguides for use in long distance transmission. The first involves the loss properties of the fiber. Clearly, the greater the loss in signal strength as the signal traverses the fiber, the greater the need for repeaters and the less commercially viable the resulting transmission system. Current technology is capable of yielding fibers of loss less than 10dB/km, which makes repeaterless transmission feasible for distances as great as 5km.

The second property of interest in the design of an optical fiber involves pulse dispersion. When the optical signal is transmitted in the form of optical pulses, the width of the pulse must maintain a value reasonably close to its initial value in order to prevent overlap between the various pulses and hence reduction in the high bandwidth capabilities of the system. The significance of the present invention can be more realistically evaluated with a greater understanding of pulse dispersion and the means used for reducing its undesirable effects.

Pulse dispersion originates in at least two distinct physical processes. The first is referred to as "material dispersion" and is related to the well-known dependence of the velocity of light in a given medium on the frequency of light being transmitted. A pulse of light which is not purely monochromatic will broaden as it is transmitted through the waveguide material due to the different velocities of the various frequency components of the light which comprise the pulse.

The effects of material dispersion are usually overshadowed by a second problem referred to as "mode dispersion". The light transmitted through an optical fiber waveguide can be considered as propagating in any one of a large number of modes. Each mode may be thought to be associated with a particular path which a light ray traverses in propagating through the fiber. One mode or path proceeds directly down the center of the fiber. The paths associated with other modes involve reflection off the walls of the fiber any number of times, depending upon the particular mode. Clearly, each mode has associated with it a particular path length. The central mode has the shortest path length. The modes corresponding to reflected paths have longer path lengths. In a single composition fiber the amount of time required for a given signal pulse to traverse the fiber in a given mode will vary directly with the path length associated with the given mode. Hence a given pulse, which may be transmitted in a multitude of modes, will be broadened during its traversal of the waveguide because of the different traversal times associated with the different modes, i.e., those parts of the pulse propagating in the short distance modes will arrive at the far end of the fiber earlier than those parts of the pulse propagating in the long distance modes. Technically the modes do not have a path length. This terminology refers to the length of the ray path associated with the mode. Clearly, a single mode fiber will not display this pulse dispersion phenomenon, but multimode fibers have important applications and the pulse dispersion problem must be solved before many of these applications can be effectively realized.

Reduction in pulse dispersion may be realized in a fiber which has a radially graded index of refraction, with a maximum index at the fiber center and a minimum at the fiber core perimeter. Such fibers are discussed, for example, in U.S. Pat. No. 3,826,560 issued July 30, 1974. The reduction of pulse dispersion in such fibers is in part related to the fact that the velocity of light is inversely proportional to the index of refraction of the material through which the light is propagated. Hence, in a radially graded fiber of the type just described, the velocity of light will be higher near the walls of the fiber and lower at the fiber center. Since the long distance modes are predominately located near the fiber perimeter, the radial gradation will tend to compensate for the pulse dispersion associated with the different path lengths of the various modes. Under such circumstances the traversal times associated with the various modes will be more nearly equal and the pulse dispersion will be minimized.

In an article by S. D. Personik published in Volume 50 of the *Bell System Technical Journal* at p. 843, an alternative technique was suggested for reducing pulse dispersion. Personik suggested that while normal pulse dispersion increases the width of a given pulse proportionately to the length of the fiber, a fiber which is fabricated so as to enhance conversion between the various propagating modes will result in pulse dispersion which increases the width of the pulse proportionately only to the square root of the length of the fiber. Such mode conversion may be induced by fabricating the fiber with periodic longitudinal variations in its optical properties such as index of refraction, or in its physical properties such as the diameter of the transmitting core of the fiber.

The diameter of an optical waveguide has been controlled during the drawing process in prior art processes. For example, in U.S. Pat. No. 3,865,564 issued to R. E. Jaeger on Feb. 11, 1975 at column 7, line 12, a technique is described for monitoring the diameter of the fiber and changing the drawing parameters in response to variations in the fiber diameter, in order to attain a fiber of approximately constant diameter. In FIG. 4 of the Jaeger patent, it is clear that the monitoring device is placed a significant distance from the heating apparatus and, consequently, it is apparent that this feedback mechanism cannot, and was not meant to, fabricate fibers with low period diameter variations necessary for efficient mode conversion.

U.S. Pat. No. 3,912,478 issued to H. M. Presby on Oct. 14, 1975 describes a technique for fabricating a fiber with diameter variations of sufficient periodicity to enhance mode conversion. In this technique the fiber is periodically cooled thereby producing the requisite diameter variations.

SUMMARY OF THE INVENTION

This invention is a technique for simultaneously drawing an optical fiber using a laser heat source and producing in the fiber, as it is drawn, diameter variations at a rate greater than ten times a second. In a preferred embodiment the diameter variations appear with a periodicity of less than 10mm and result in a fiber showing enhanced mode conversion. In order to yield these diameter variations the laser source is pulsed rapidly with time at a rate greater than 10Hz. It is found that despite the large mass present in the neckdown region of the optical fiber preform, such rapid fluctuations in the heat source are reflected in diameter variations in the drawn fiber. It is found unexpectedly that the thermal response properties in the glass are sufficiently rapid to follow such fluctuations in the laser source.

DETAILED DESCRIPTION OF THE DRAWINGS

Figure 1:
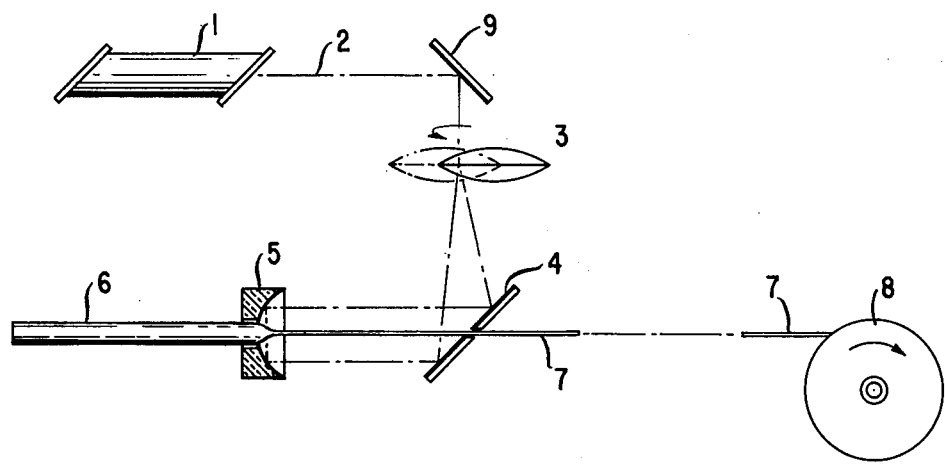
FIG. 1 is a schematic representation of an apparatus which may be used in the practice of this invention.

The most prevalent technique for fabricating optical fiber waveguides involves pulling a fiber, of diameter less than 500 microns, and usually less than 200 microns, from a large cylindrical mass of very pure glass commonly referred to as a preform. The preform may have specific optical properties which then appear in the fiber and improve the transmission properties of the waveguide. The preform may also include the optical fiber cladding and, in some cases, even a protective jacket. Upon drawing such a preform into a fiber, the waveguide is produced.

Drawing the fiber from the preform involves heating the end of the preform until the glass is in a molten state, and then drawing the fiber from this molten region. The preform may be heated by any one of a number of techniques to produce this molten state, including the use of a resistive oven, a flame burner or a laser as described in U.S. Pat. No. 3,865,564. The laser drawing process avoids numerous contamination and stability problems encountered in the other drawing techniques and, in addition, permits the careful focusing of the laser light to a specific and limited region of the preform, thereby improving the drawing dynamics.

The laser process has been recognized as particularly useful in controlling the diameter of the drawn fiber. Such uniform diameters are desirable both for improving transmission properties and also for ease in cabling and splicing operations. Random diameter variations result in the introduction of radiating modes and thereby increase the loss characteristics of the fiber. If the laser drawing process is used, a detector and an associated feedback mechanism may be utilized to sense long term variations in the diameter of the fiber as it is drawn and to alter the power of the laser to correct for these diameter variations. Such feedback techniques contemplate the correction of diameter variations which extend over distances of many inches as indicated by the relative position of the detector and the molten preform section in FIG. 4 of the previously mentioned United States patent.

Whereas random variations in diameter lead to the introduction of radiating modes and, consequently, to an increase in the loss characteristics of the fiber, it is shown in U.S. Pat. No. 3,687,514 that the introduction of periodic variations in diameter improves the transmission characteristics of the fiber without significantly increasing its loss properties. The period of such diameter variations must be related to the difference in the fourier frequencies associated with the transmitting modes which the practitioner desires to cause to interact in the fiber. The periodicity for which such diameter variations are effective depends on a number of fiber parameters, and for certain unusual fibers may be as large as approximately five centimeters. However, for most fibers and for wavelengths of interest in optical transmission, the period of such diameter variations usually falls between 1 and 10mm in the optical fiber waveguide. While diameter variations which are one part in $10^5$ of the overall diameter may theoretically result in improvement in pulse dispersion, practical diameter variations are usually greater than 0.1 percent and in a specific embodiment greater than 0.5 percent of the overall fiber diameter. The diameter variations are usually less than 10 percent and the most instances less than 5 or even 2 percent of the overall fiber diameter.

For most efficient mode conversion, interaction must be stimulated between all of the transmitting modes. Simple diameter variations cause conversion only between modes of the same azimuthal number. Additional variations in optical properties of the fiber may be designed into the waveguide to yield mode conversion between guiding mode of different azimuthal number as discussed in U.S. Pat. No. 3,909,110. Even such fibers may benefit from some degree of variation in the diameter of the transmitting core and this variation may be fabricated in the fiber using this invention.

The periodicity of the diameter variation required to stimulate mode conversion in optical fibers may not be limited to a single value but may rather fall within a range of values. Illustrative of this is the step index fiber which requires a range of periodicity in diameter variations to efficiently stimulate mode dispersion. On the other hand, a radially graded fiber with an approximately parabolic index configuration generally only requires diameter variations with a single period to efficiently effect mode conversion.

With the introduction of periodic diameter variations and the resultant enhancement in conversion between transmitting modes, the breadth of optical pulses transmitted through the fiber increases only as the square root of the length of the fiber rather than directly with the length of the fiber as is the case in nonmode-converting fibers. Periodic variations in other optical properties of the fiber will yield additional improvement in the transmission properties of the fiber, but the diameter variations are of primary interest to the present invention.

For diameter variations of period less than 1mm there is generally an increase in coupling between guiding modes and radiating modes thereby adversly effecting the loss characteristics of the fiber. Generally, losses less than 10dB/km are required for fibers that are to be used in long distance transmission, and losses less than 500dB/km, and usually less than 200dB/km, are used for short sections of fiber to be used as optical filters. If optical filters are required, diameter variations are designed into the fiber which couple specific guiding modes to radiating modes thereby removing the specific guiding modes from the fiber. Diameter variations of period greater than 10mm are generally less effective in coupling guiding modes within the fiber.

The technological question which this invention answers is whether or not diameter variations of the kind required for mode conversion may be impressed on a fiber during the laser drawing process, and by the laser used for drawing, in such a manner as to maintain the viability of laser drawing. The central point involved in this question concerns the thermal inertia of the glass and the ability of the molten neckdown region to respond to rapid variations in the laser power level so as to yield a fiber with periodic diameter variations. It is known that rapid alterations in the drawing rate or in the feed rate of the preform will yield such diameter variations. However, it had not been known prior to this invention whether or not the response time of the molten neckdown region was sufficiently rapid to yield a fiber whose diameter variations reflect the rapid pulsing in the power levels of the laser.

In addition, a related question which involves the nature of the laser focus on the preform had not been answered prior to this invention. It appears that the sharper the focus of the laser onto the preform the less uniform the diameter characteristics of the drawn fiber. On the other hand it is clear that as the laser is defocused on the preform, the power delivered to a given mass of glass is diminished, and the response time to variations in the laser power will consequently increase thereby precluding the possibility of obtaining diameter variations in the drawn fiber by rapidly varying the power level of the laser. A detailed understanding of the focusing configuration utilized during the laser drawing process is necessary to appreciate the answers which this invention has provided to the above questions.

In FIG. 1 a typical laser drawing apparatus is shown. In this figure, 1 is a source of laser radiation of wavelength such that the preform absorbs a significant amount of the optical energy from the laser and thereby becomes heated and transformed to a molten state. The laser light 2 is transmitted through an eccentrically rotating lens 3 thereby yielding an annular configuration of light. A mirror 9 may be used to guide the light to the lens. This annular region is reflected off a mirror 4 and onto a focusing section 5 from where the laser light is focused onto the preform 6. The optical fiber 7 is drawn from the preform and wound onto a reel 8.

It has been found in the prior art that the nature of the focusing device 5 is critical to the stability of the drawing process. If 5 is a conical reflector, the annular region of light is focused down to a line which may be coaxial with the preform axis. Under such circumstances, the alignment of the preform and of the focused line is critical. Any alteration in the alignment will affect the uniformity of the fiber diameter. However, the very sharp focus naturally increases the response properties of the fiber diameter to any variations in the power level of the laser. This is most desirable if diameter variations are to be impressed on the fiber by pulsing the laser. However, it is found that the alignment difficulties far outweigh the ease with which diameter variations can be impressed on the fiber using such a focusing configuration.

An alternative focusing configuration is presented in a commonly assigned application Ser. No. 574,437. In this application it is shown that a faceted conical reflector yields a cylindrical image within or on the fiber preform which significantly reduces the requirement for exact alignment during the drawing process. The faceted conical reflector, instead of having a perfectly circular cross section orthogonal to the symmetry axis, is made up of facets each of which has a radius of curvature either longer or shorter than that of the associated perfectly circular conical reflector. While the defocusing which results from the use of a faceted conical reflector improves the overall stability of the drawing process, it decreases the energy density transmitted to the optical fiber preform and, consequently, would be expected to decrease the thermal response properties of the drawing process. Applicants have found, however, that using this focusing means the laser may be pulsed at rates greater than ten times per second to yield, in a specific embodiment, periodic diameter variations in the fiber of period of less than 10mm, depending upon the drawing speed.

While the most general embodiment of this invention simply involves pulsing the laser to yield the periodic diameter variations necessary for enhanced mode conversion, alternative embodiments include other limitations which may be helpful in particular applications. It is found, for example, that the greatest stability is obtained if the cylindrical image of the laser has a diameter at least as great as one-third the diameter of the preform. Preform diameters of greater than 3mm are most practical for the practice of this invention and a multifaceted conical reflector with at least three facets is found to be most desirable. Reflectors with greater numbers of facets are found to yield fibers of more uniform diameter variations, and experiments have been done with reflectors with both 12 and 24 planar facets as well as with 3, 6 and 24 curved facets. In general, it is found that a reflector with between 20 and 50 planar facets is found to be most effective. While pulsing the laser at 10Hz is effective, more rapid drawing rates, made possible by pulsing the laser at 20, 50 or even 100Hz, may make these higher pulsing rates more desirable. The variation in power necessary to yield diameter variations in the fiber may be normalized to the mass flow per unit time through the neckdown region. In a specific embodiment the normalized power variation is greater than $10^2$ watt sec/cm$^3$. The laser need not be completely turned off every half cycle to accomplish this variation.

The transmitting core of the optical fiber is practically never used in its pristine state without a cladding. The cladding may be fabricated as an integral part of the preform and in such cases this invention may be used to yield a clad optical fiber which has periodic overall diameter variations not only effecting the diameter of the cladding but effecting the diameter of the core as well. In such a fiber the transmitting core displays the requisite periodic variations in diameter.

In many instances an optical cladding or a protective jacket is placed on the optical fiber after it is drawn. The cladding is necessary to yield effective guiding properties, while the jacket increases the strength of the fiber and protects it from environmental damage. The prevalent cladding and jacket materials comprise polymeric compounds which are applied to the fiber by means of specially designed applicators. The applicator is usually placed just below the point where the fiber is drawn from the preform thereby exposing the pristine fiber to as little of the ambient environment as possible. The polymeric material may be cured using heat, ultraviolet radiation, or any other appropriate curing mechanisms. Such a cover may be placed on the fiber despite the fact that the fiber at the applicator already has periodic variations in it. These variations do not effect the efficacy of the cover application step.

EXAMPLE

Figure 2:
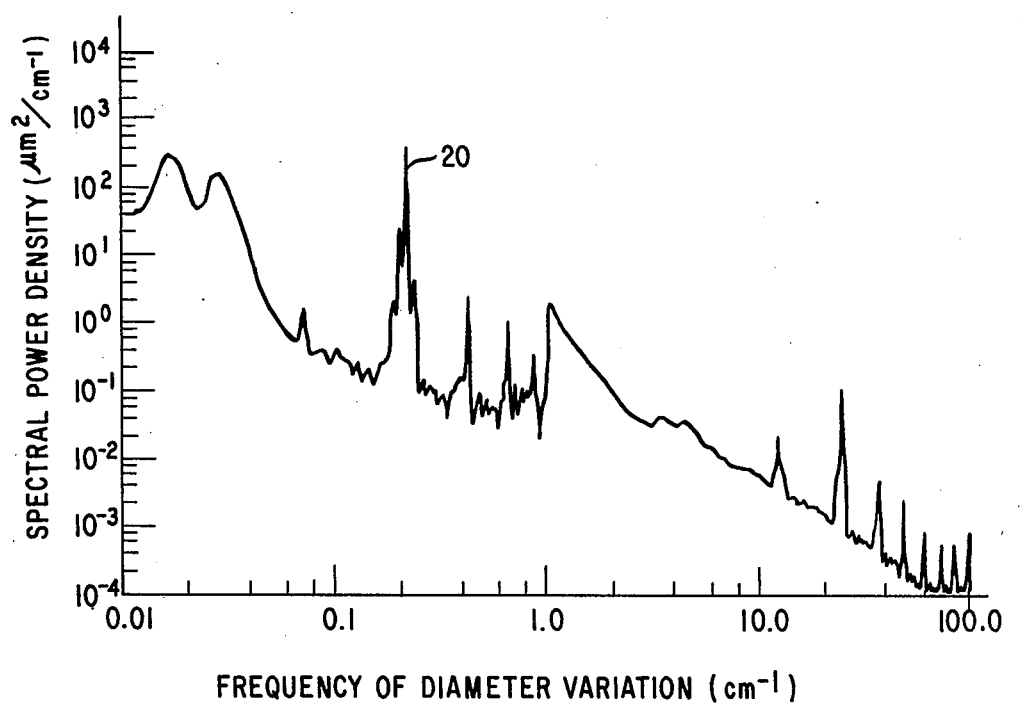
FIG. 2 is a graphical analysis of diameter variations of a fiber drawn using the apparatus of FIG. 1 and the techniques of this invention.

In an exemplary embodiment of this invention a silica preform 7mm in diameter and 10cm long was drawn into a fiber approximately 100 microns in diameter using a laser drawing apparatus. The preform was fed at a rate of 0.016cm/sec. and the fiber was drawn at 91.7cm/sec. The focusing device was a 24 planar faceted reflector which focused the annular light region to a cylindrical image 8mm long and 3mm in diameter approximately coaxial with the preform. The annular region was formed by the asymmetric rotation of a lens at the rate of 100 times per second. A 205 watt $CO_2$ laser was pulsed with a 52 millisecond period to yield diameter variations of approximately 1.0 microns standard deviation. The diameter of the fiber was analyzed using a forward light scattering technique described by L. S. Watkins in the *Journal of Optical Society of America*, Vol. 64 at page 767 (1974). The result of this analysis is shown in FIG. 2.

In this figure, 20 is the periodic diameter variations which resulted from the pulsing of the laser. The diameter variations are not helical but rather are peristaltic.

What is claimed is:

1. A method of fabricating an optical fiber with periodic diameter variations along the length of the fiber comprising:

focusing light emitted from a laser onto the drawdown zone of an optical fiber preform;

heating the drawdown zone of the optical fiber preform to a molten state using the focused laser light;

pulsing the laser light;

feeding continuously the preform into the region of focused laser light;

the invention characterized in that the laser light is pulsed at a rate greater than 10Hz and an optical fiber is drawn from the molten region of the preform, with diameter variations of magnitude greater than 0.1 percent of the fiber diameter and of period over the fiber length of less than 10mm.

2. The method of claim 1 wherein the diameter variations are of period between 1 and 10mm.

3. The method of claim 1 wherein the diameter variations are of period less than 1mm.

4. The method of claim 1 wherein the laser light is focused onto the preform using a faceted conical reflector.

5. The method of claim 1 wherein the laser light is focused into a cylindrical image approximately coaxial with the preform axis and of diameter greater than one-third the diameter of the preform.

6. The method of claim 1 wherein the preform includes an optical cladding.

7. The method of claim 1 wherein the optical fiber is clad with a polymeric protective material during the drawing process.

* * * * *